United States Patent
Tran et al.

(10) Patent No.: US 10,884,433 B2
(45) Date of Patent: Jan. 5, 2021

(54) AERIAL DRONE UTILIZING POSE ESTIMATION

(71) Applicant: NEC Laboratories America, Inc., Princeton, NJ (US)

(72) Inventors: Quoc-Huy Tran, Santa Clara, CA (US); Manmohan Chandraker, Santa Clara, CA (US); Hyo Jin Kim, Chapel Hill, NC (US)

(73) Assignee: NEC Corporation

(*) Notice: Subject to any disclaimer, the term of this patent is extended or adjusted under 35 U.S.C. 154(b) by 221 days.

(21) Appl. No.: 16/100,479

(22) Filed: Aug. 10, 2018

(65) Prior Publication Data
US 2019/0064851 A1 Feb. 28, 2019

Related U.S. Application Data

(60) Provisional application No. 62/550,790, filed on Aug. 28, 2017.

(51) Int. Cl.
*G05D 1/08* (2006.01)
*G06T 7/73* (2017.01)
(Continued)

(52) U.S. Cl.
CPC ......... *G05D 1/0816* (2013.01); *B64C 39/024* (2013.01); *G01C 21/32* (2013.01); *G05D 1/0088* (2013.01); *G06F 16/29* (2019.01); *G06N 3/0454* (2013.01); *G06N 3/08* (2013.01); *G06N 5/046* (2013.01); *G06T 7/0002* (2013.01); *G06T 7/73* (2017.01); *G06T 7/74* (2017.01); *G08G 5/0013* (2013.01); *G08G 5/0021* (2013.01);
(Continued)

(58) Field of Classification Search
CPC ...... G05D 1/0816; G05D 1/0088; G06T 7/74; G06T 7/73; G06T 7/0002; G06F 16/29; B64C 39/024; G01C 21/32; G06N 3/0454; G06N 3/08; G06N 5/046; G08G 5/0013; G08G 5/0021; G08G 5/0069
See application file for complete search history.

(56) References Cited

U.S. PATENT DOCUMENTS

| 10,037,028 B2 * | 7/2018 | Loianno | G01C 21/165 |
| 2013/0176423 A1 * | 7/2013 | Rischmuller | G05D 1/0038 348/114 |

(Continued)

OTHER PUBLICATIONS

Zhang, "Good Features to Track for Visual Slam", Proceedings of IEEE Conference on Computer Vision Pattern Recognition, Jun. 2015, pp. 1373-1382.

(Continued)

*Primary Examiner* — Hussein Elchanti
(74) *Attorney, Agent, or Firm* — Joseph Kolodka

(57) ABSTRACT

A computer-implemented method, system, and computer program product are provided for a stabilization system utilizing pose estimation in an aerial drone. The method includes receiving, by a pose estimation system, a plurality of images from one or more cameras. The method also includes predicting, by the pose estimation system, a pose from the score map and a combined feature map, the combined feature map correlated from a pair of the plurality of images. The method additionally includes moving, by a propulsion system, the aerial drone responsive to the pose.

18 Claims, 9 Drawing Sheets

(51) Int. Cl.
    G05D 1/00      (2006.01)
    G08G 5/04      (2006.01)
    B64C 39/02     (2006.01)
    G08G 5/00      (2006.01)
    G06N 3/04      (2006.01)
    G06N 3/08      (2006.01)
    G06N 5/04      (2006.01)
    G06T 7/00      (2017.01)
    G06F 16/29     (2019.01)
    G01C 21/32     (2006.01)

(52) U.S. Cl.
    CPC ......... *G08G 5/0069* (2013.01); *G08G 5/0086*
        (2013.01); *G08G 5/045* (2013.01); *B64C*
        *2201/141* (2013.01); *G05D 2201/0213*
        (2013.01); *G06T 2207/20081* (2013.01); *G06T*
        *2207/20084* (2013.01); *G06T 2207/30244*
        (2013.01)

(56) References Cited

U.S. PATENT DOCUMENTS

| | | | | |
|---|---|---|---|---|
| 2014/0008496 A1* | 1/2014 | Ye | ........................... | B64C 13/20 244/190 |
| 2014/0099853 A1* | 4/2014 | Condon | ................ | A63F 13/245 446/37 |
| 2014/0138477 A1* | 5/2014 | Keennon | ................ | B64C 39/024 244/17.23 |
| 2015/0149000 A1* | 5/2015 | Rischmuller | .......... | G05D 1/102 701/7 |
| 2015/0321758 A1* | 11/2015 | Sarna, II | ................ | B64C 39/024 244/63 |
| 2016/0132052 A1* | 5/2016 | Seydoux | ................ | G05D 1/0022 701/2 |
| 2016/0139596 A1* | 5/2016 | Na | ........................ | G05D 1/0022 701/2 |
| 2016/0200438 A1* | 7/2016 | Bokeno | .................. | G05D 1/102 244/2 |
| 2016/0214713 A1* | 7/2016 | Cragg | .................... | B64C 39/024 |
| 2016/0214715 A1* | 7/2016 | Meffert | .................. | B64C 39/024 |
| 2017/0301111 A1* | 10/2017 | Zhao | .................... | G01C 25/005 |
| 2019/0026531 A1* | 1/2019 | Alvarez Gonzalez | ..................... | G06K 9/0063 |

OTHER PUBLICATIONS

Lee, "Exploiting Feature Confidence for Forward Motion Estimation" Proceedings of IEEE/RSJ International Conference on Intelligent Robots and Systems, Aug. 2017, pp. 1-7.

Zhou, "Unsupervised Learning of Depth and Ego-Motion from Video" Proceedings of IEEE Conference on Computer Vision and Pattern Recognition, Jul. 2017, pp. 1-10.

Kim, "Learned Contextual Feature Reweighting for Image Geo-Localization", CVPR, Jul. 2017, pp. 2136-2145.

* cited by examiner

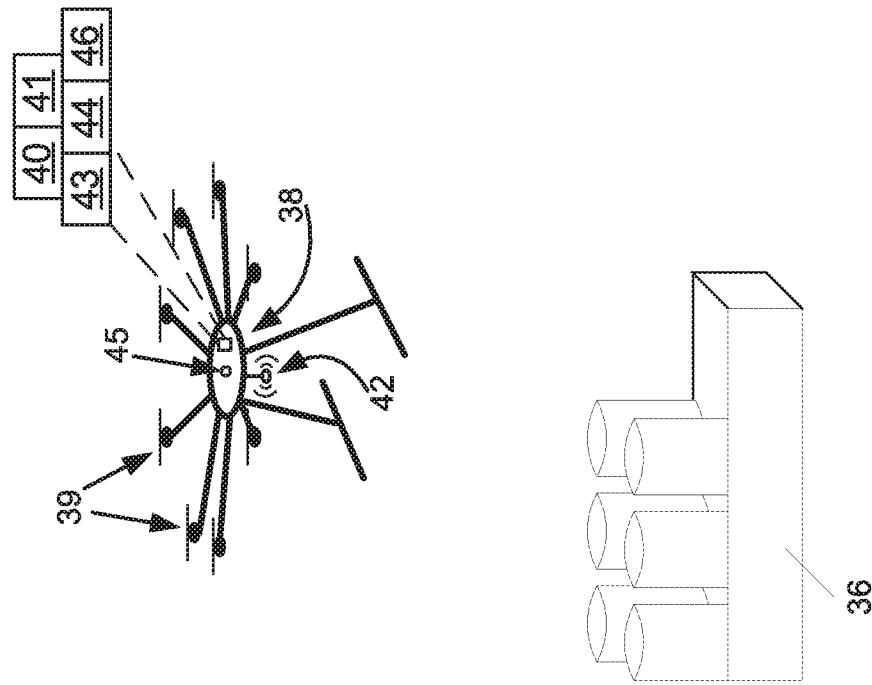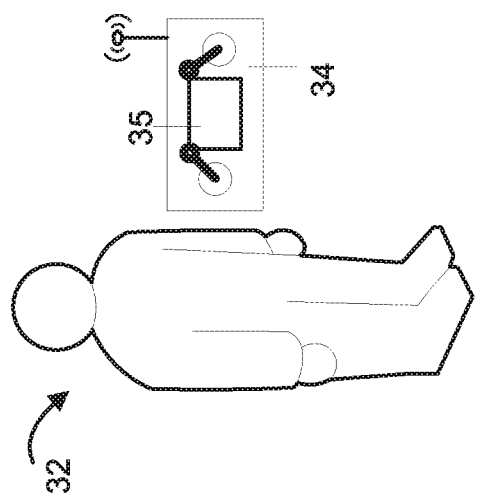
FIG. 1

US 10,884,433 B2

AERIAL DRONE UTILIZING POSE ESTIMATION

RELATED APPLICATION INFORMATION

This application claims priority to 62/550,790, filed on Aug. 28, 2017, incorporated herein by reference herein its entirety. This application is related to an application entitled "Learning Good Features for Visual Odometry", and which is incorporated by reference herein in its entirety. This application is related to an application entitled "Autonomous Vehicle utilizing Pose Estimation", and which is incorporated by reference herein in its entirety

BACKGROUND

Technical Field

The present invention relates to visual odometry and more particularly to selecting features that are beneficial for pose estimation in visual odometry.

Description of the Related Art

Visual odometry is the process of estimating the ego-motion (i.e., three-dimensional (3D) pose) of an agent (e.g., vehicle, robot) using only the input of cameras attached to it. State-of-the-art visual odometry systems are based on hand-crafted features such as scale-invariant feature transform (SIFT) and oriented features from accelerated segment test (FAST) and rotated binary robust independent elementary features (BRIEF), or Oriented FAST and rotated BRIEF (ORB), and tend to keep features that are easy to detect or to track but not good for pose estimation. For example, distant points may be may be easy to track due to their small motions in images but produce high uncertainty in pose estimation; or points on trees or buildings are plentiful but can be uninformative due to their ambiguous textures.

SUMMARY

According to an aspect of the present principles, an aerial drone utilizing pose estimation is provided. The aerial drone includes one or more cameras for capturing images of the aerial drone surroundings. The aerial drone also includes a propulsion system for moving the aerial drone responsive to a stabilization system. The stabilization system includes a pose estimation system that receives a plurality of images from the one or more cameras and predicts a pose from a score map and a combined feature map, the combined feature map generated from a pair of the plurality of images.

According to another aspect of the present principles, a computer program product is provided for an aerial drone with stabilization system utilizing pose estimation. The computer program product comprising a non-transitory computer readable storage medium having program instructions. The program instructions are executable by a computer to cause the computer to perform a method. The method includes receiving, by a pose estimation system, a plurality of images from one or more cameras. The method also includes predicting, by the pose estimation system, a pose from the score map and a combined feature map, the combined feature map correlated from a pair of the plurality of images. The method additionally includes moving, by a propulsion system, the aerial drone responsive to the pose.

According to yet another aspect of the present principles, a computer-implemented method is provided for a stabilization system utilizing pose estimation in an aerial drone. The method includes receiving, by a pose estimation system, a plurality of images from one or more cameras. The method also includes predicting, by the pose estimation system, a pose from the score map and a combined feature map, the combined feature map correlated from a pair of the plurality of images. The method additionally includes moving, by a propulsion system, the aerial drone responsive to the pose.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 shows an exemplary system for an aerial drone utilizing three-dimensional pose estimation, in accordance with an embodiment of the present principles;

DETAILED DESCRIPTION OF PREFERRED EMBODIMENTS

Figure 2:
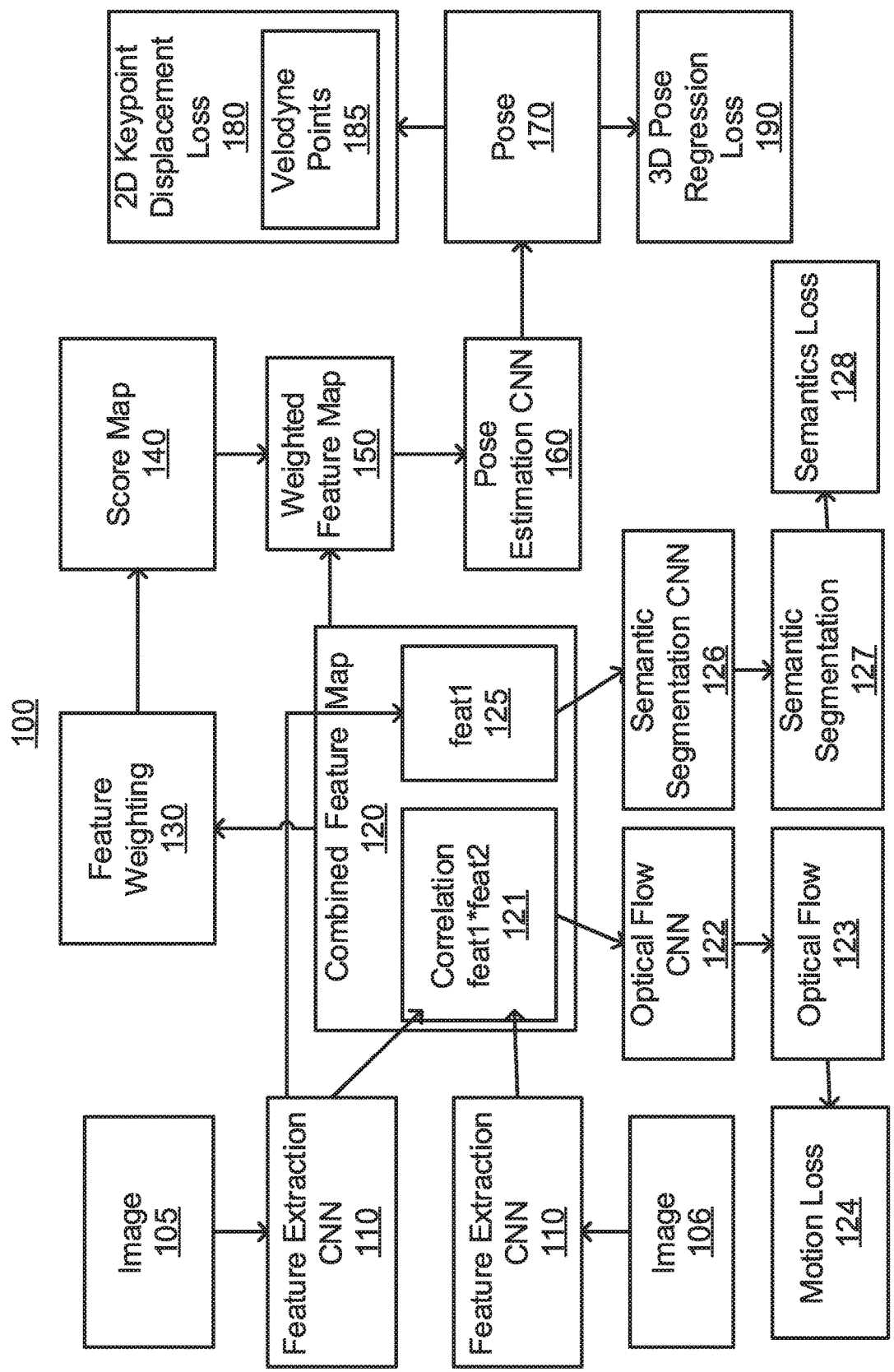
FIG. 2 shows block/flow diagram of an exemplary system for training a three-dimensional pose estimation network, in accordance with an embodiment of the present invention.

Aspects of the present invention select features that are beneficial for pose estimation by using convolutional neural networks (CNNs) to consider different aspects of the features such as semantics and motions.

Aspects of the present invention employ a novel CNN architecture for computing score maps that are used for selecting good features employed for pose estimation.

The novel CNN architecture for score map prediction that takes into account various factors such as semantics and motions and is designed for direct benefits towards pose estimation. Different signals are used such as semantics and motions to supervise intermediate layers before predicting score maps. Furthermore, the estimated score maps are incorporated directly into intermediate layers that are used for pose prediction. In this way, the score maps have direct effects on pose estimation.

Aspects of the present invention output score maps that can be visually interpretable on the image domain. The present invention can work with as few as two images, without the need of an inertia measurement unit (IMU), and can handle various cases of bad features due to deep supervision of semantics and motions. Since the present invention is designed for direct benefits towards pose estimation, it produces more accurate score maps and better pose estimates.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium can be configured to cause a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times the code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary system for an aerial drone utilizing three-dimensional pose estimation is illustratively depicted in accordance with an embodiment of the present invention. The system 30 can include an aerial drone 38. In one embodiment, the aerial drone 38 can be an octo-copter. In other embodiments, the aerial drone 38 can include a plane-style drone. The aerial drone 38 can include a propulsion system 39. In one embodiment, the propulsion system 39 can include propellers or other engines for flying the aerial drone 38. In another embodiment, the propulsion system 39 can include a jet engine or hover technology. The propulsion system 39 can include one or more motors, which can include an internal combustion engine, electric motor, etc.

The aerial drone 38 can include a power source 40. The power source 40 can include or employ one or more batteries, liquid fuel (e.g., gasoline, alcohol, diesel, etc.) or other energy sources. In another embodiment, the power source 40 can include one or more solar cells or one or more fuel cells. In another embodiment, the power source 40 can include combustive gas (e.g., hydrogen).

The aerial drone 38 can be equipped with computing functions and controls. The aerial drone 38 can include a processor 41. The aerial drone 38 can include a transceiver 42. In one embodiment, the transceiver 42 can be coupled to a global position system (GPS) to generate and alert of a position of the aerial drone 38 relative to other vehicles in a common coordinate system. The transceiver 42 can be equipped to communicate with a cellular network system. In this way, the aerial drone's position can be computed based on triangulation between cell towers base upon signal strength or the like. The transceiver 42 can include a WIFI or equivalent radio system. The processor 41, transceiver 42, and location information can be utilized in a stabilization system 43 for the aerial drone 38.

The aerial drone 38 can include memory storage 44. The memory storage 44 can include solid state or soft storage and work in conjunction with other systems on the aerial drone 38 to record data, run algorithms or programs, control the drone, etc. The memory storage 44 can include a Read Only Memory (ROM), random access memory (RAM), or any other type of memory useful for the present applications.

The aerial drone 38 can include one or more cameras 45. The one or more cameras 45 can view the area surrounding the aerial drone 38 to input images into a three-dimensional pose estimation system 46 and the stabilization system 43 of the aerial drone 38. The one or more cameras 45 can view objects around the aerial drone 38, e.g., other vehicles, building 36, light poles, trees, etc. The images obtained by the one or more cameras 45 can be processed in the three-dimensional pose estimation system 46 to learn the pose of the aerial drone 38 without an IMU. The pose of the drone can be utilized by the stabilization system 43 to adjust the propulsion system 39 of the aerial drone 38 to avoid objects around the aerial drone 38 or remain level.

The transceiver 42 can be in communication with a remote control device 34. The remote control device 34 can have a display 35 for showing what is currently around the aerial drone 38 from the perspective of the one or more cameras 45. A user 32 can use the remote control device 34 to control the aerial drone 38 while in flight. The pose of the drone estimated from the images captured by the one or more cameras 45 can be used to provide an easier to fly and maneuver aerial drone 38 since the aerial drone 38 can keep itself level in changing weather conditions, e.g., wind.

Referring to FIG. 2, a block/flow diagram of an exemplary system for training a three-dimensional pose estimation network is illustratively depicted in accordance with one embodiment of the present invention. The training of the three-dimensional pose estimation network 100 can have two input images 105 and 106. The two input images 105 and 106 can each be passed through a feature extraction CNN 110 to produce feature maps feat1 125 and feat2 respectively, which are employed to compute a correlation feat1*feat2 121. The feature extraction CNN 110 can include a set of convolutional layers to extract the feature maps feat1 125 and feat2. The correlation feat1*feat2 121 can be achieved via multiplicative local patch comparisons or dot products of feature vectors in corresponding local patches between the two feature maps feat1 125 and feat2. A combined feature map 120, including the correlation feat1*feat2 121 and feat1 125, can then be fed to a feature weighting 130 to estimate a score map 140. The correlation feat1*feat2 121 can be fed into an optical flow CNN 122 to determine an optical flow 123. The optical flow 123 can be used to determine motion loss 124. The feat1 125 can be fed into a semantic segmentations CNN 126 to determine a semantic segmentation 127. The semantic segmentation 123 can be used to determine semantics loss 128. The motion loss 124 and the semantics loss 128 can be utilized to train the combined feature map 120 for future combinations. The optical flow CNN 122 and the semantic segmentation 126 can include optionally a set of convolution layers and then require a set of deconvolutional layers to predict the dense optical flow 123 and the dense semantic segmentation 127 respectively from the correlation feat1*feat2 121 and the feature map feat1 125.

The score map 140 can be employed to update the combined feature map 120, including correlation feat1*feat2 121 and feat1 125, and obtain a weighted feature map 150. In another embodiment, by our design, the combined feature map 120 and the score map 140 have the same spatial dimension of W×H (e.g., of sizes W×H×C, with C denoting the number of channels of the combined feature map 120, and W×H×1 respectively), and hence the score map 140 can be used to weight or multiply along each channel of the combined feature map 120 to obtain the (spatially) weighted feature map 150. The weighted feature map 150 can be fed to a pose estimation CNN 160 to predict a pose 170. The pose estimation CNN can consist of a set of fully connected layers with the last few layers having two separate branches for predicting a three-dimensional (3D) rotation vector and a three-dimensional (3D) translation vector respectively. The rotation and translation vectors can make up the six-dimensional (6D) pose vector 170.

The training of the three-dimensional pose estimation system 100 can have two losses for pose estimation, including a two-dimensional (2D) keypoint displacement loss 180 with Velodyne points 185 and a three-dimensional (3D) pose regression loss 190. The utilization of the 2D keypoint displacement loss 180 with Velodyne points 185 avoids vanishing gradients and makes learning poses more effective.

Figure 3:
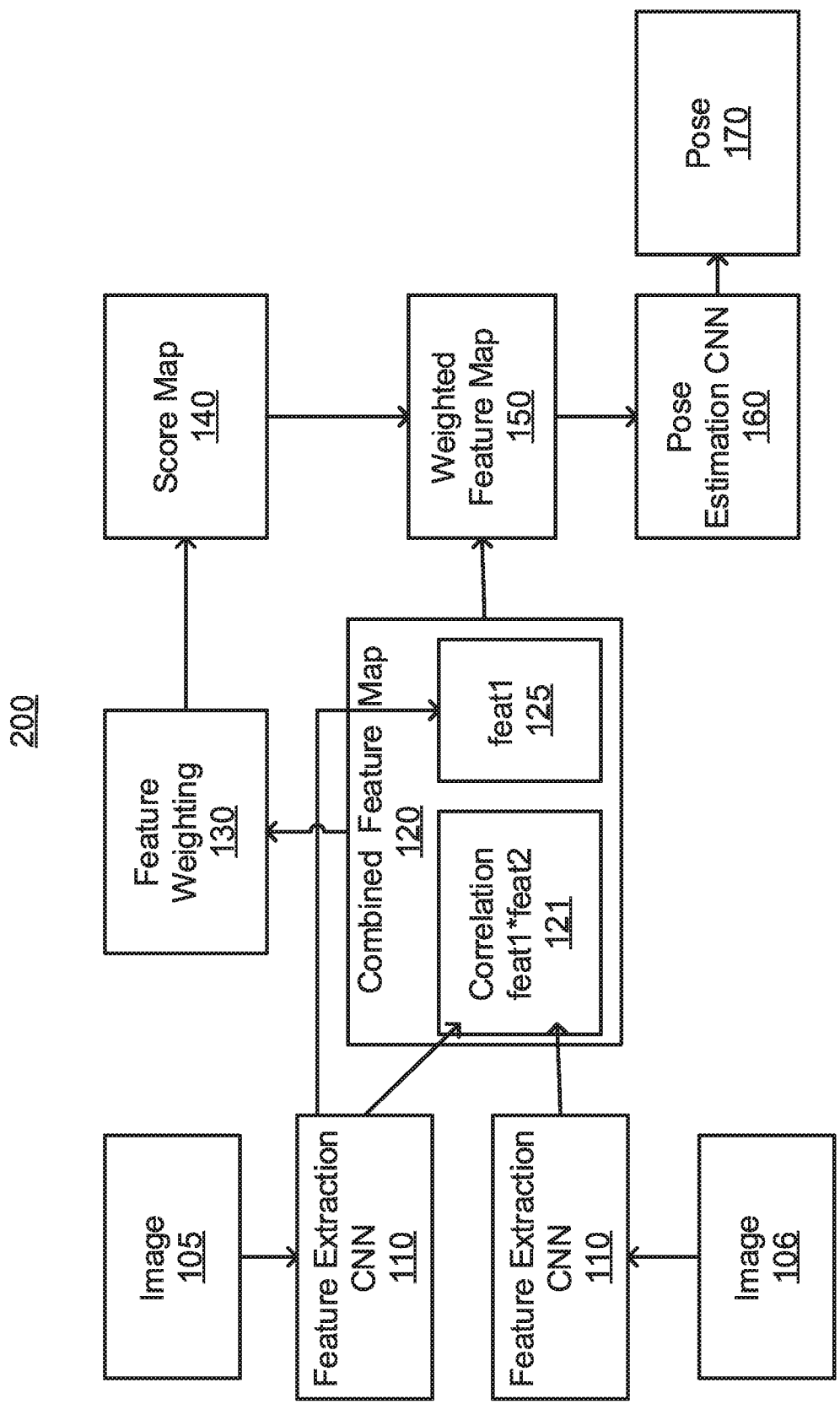
FIG. 3 shows block/flow diagrams of an exemplary system for a three-dimensional pose estimation network at deployment, in accordance with an embodiment of the present invention.

Referring now to FIG. 3, a block/flow diagram of an exemplary system for a three-dimensional pose estimation network at deployment is illustratively depicted in accordance with an embodiment of the present invention. The three-dimensional pose estimation network 200 can have two input images 105 and 106. The two input images 105 and 106 can each be passed through a feature extraction CNN 110 to produce feature maps feat1 125 and feat2 respectively, which are employed to compute a correlation feat1*feat2 121. The feature extraction CNN 110 can include a set of convolutional layers to extract the feature maps feat1 125 and feat2. The correlation feat1*feat2 121 can be achieved via multiplicative local patch comparisons or dot products of feature vectors in corresponding local patches between the two feature maps feat1 125 and feat2. A combined feature map 120, including correlation feat1*feat2 121 and feat1 125, can then be fed to a feature weighting 130 to estimate a score map 140. The score map 140 can be employed to update the combined feature map 120, including correlation feat1*feat2 121 and feat1 125, and obtain a weighted feature map 150. In another embodiment, by our design, the combined feature map 120 and the score map 140 have the same spatial dimension of W×H (e.g., of sizes W×H×C, with C denoting the number of channels of the combined feature map 120, and W×H×1 respectively), and hence the score map 140 can be used to weight or multiply along each channel of the combined feature map 120 to obtain the (spatially) weighted feature map 150. The weighted feature map 150 can be fed to a pose estimation CNN 160 to predict a pose 170. The pose estimation CNN can consist of a set of fully connected layers with the last few layers having two separate branches for predicting a three-dimensional (3D) rotation vector and a three-dimensional (3D) translation vector respectively. The rotation and translation vectors make up the six-dimensional (6D) pose vector 170.

Figure 4:
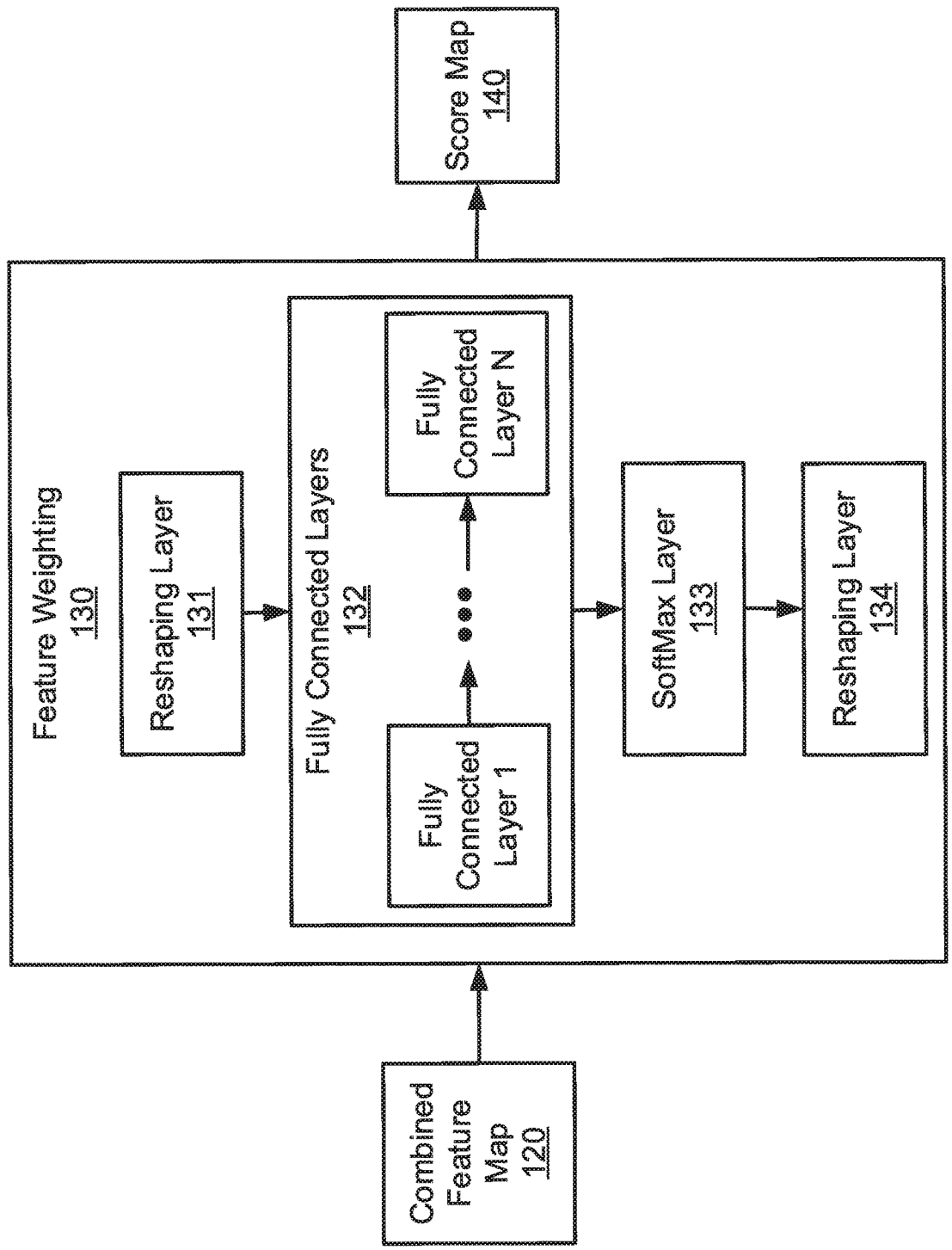
FIG. 4 shows a block/flow diagram of a feature weighting system, in accordance with an embodiment of the present invention.

Referring now to FIG. 4, a block diagram of a feature weighting system is illustratively depicted in accordance with an embodiment of the present invention. The feature weighting system 130 can take a combined feature map 120 to produce a score map 140. The feature weighting system 130 can consist of a reshaping layer 131, a set of fully connected layers 132, a softmax layer 133, and a reshaping layer 134. In one embodiment, the reshaping layer 131 can resize the combined feature map 120 of size W×H×C into a one-dimensional (1D) vector of size 1×(W.H.C), which can then be passed through a set of fully connected layers 132 of various output sizes, e.g., 1024, 512, 256, and 128 dimensional vectors for example. The output from fully connected layers 132 can then be passed to a softmax layer 133 to compute a score vector (where each entry value is between zero and one). The score vector can then be resized by the reshaping layer 134 to have the size of W×H (or the same spatial dimension as the combined feature map 120).

Figure 5:
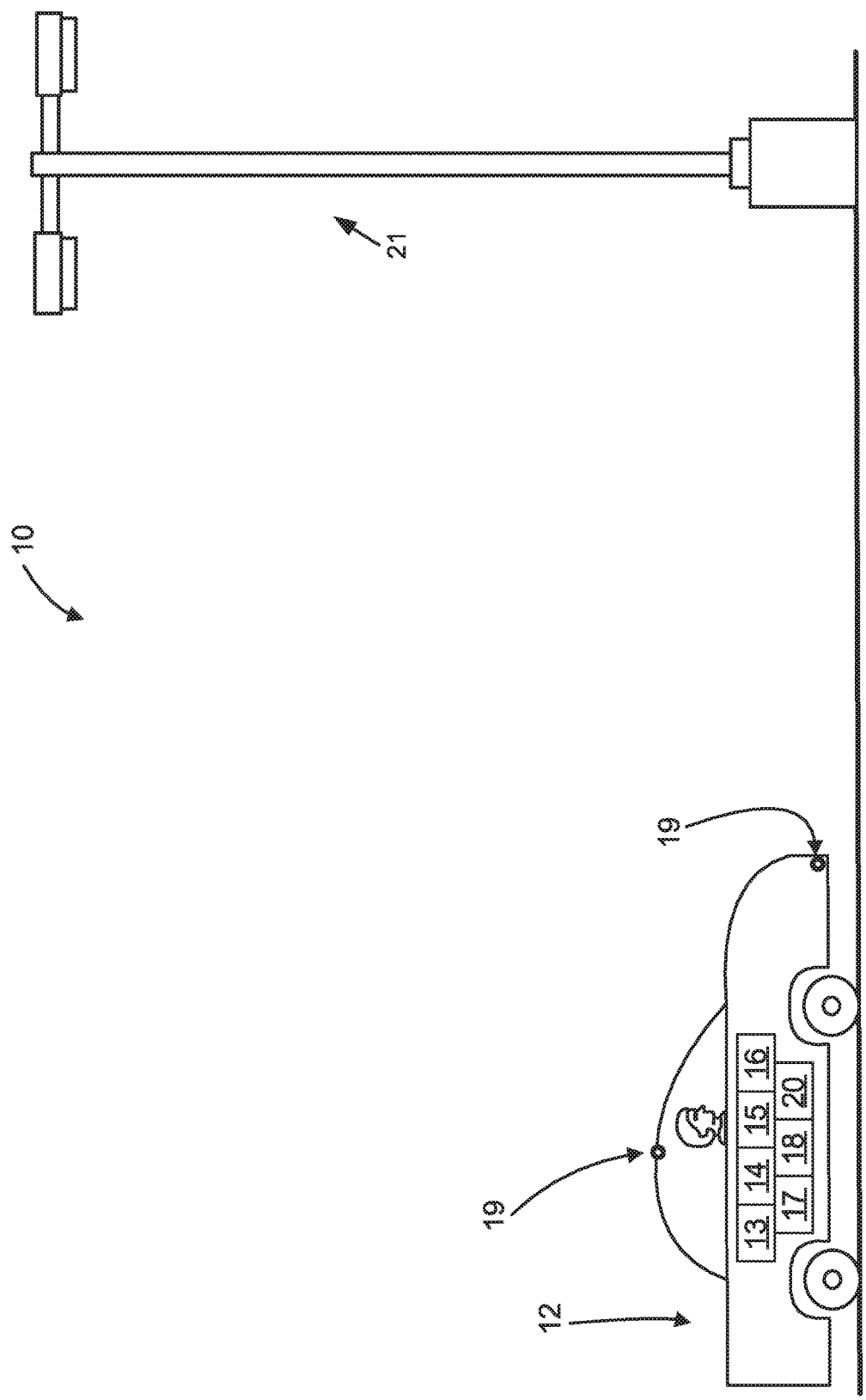
FIG. 5 shows an exemplary system for an autonomous vehicle utilizing three-dimensional pose estimation, in accordance with an embodiment of the present invention.

Referring to FIG. 5, an exemplary system for an autonomous vehicle utilizing three-dimensional pose estimation is illustratively depicted in accordance with an embodiment of the present invention. The system 10 can include an autonomous vehicle 12. In one embodiment, the autonomous vehicle 12 can be an automobile. In other embodiments, the autonomous vehicle 12 can include a boat, plane, helicopter, or truck. The autonomous vehicle 12 can include a propulsion system 13. For an airborne embodiment, the propulsion system 13 can include propellers or other engines for flying the autonomous vehicle 12. In another embodiment, the propulsion system 13 can include wheels or tracks. In another embodiment, the propulsion system 13 can include a jet engine or hover technology. The propulsion system 13 can include one or more motors, which can include an internal combustion engine, electric motor, etc.

The autonomous vehicle 12 can include a power source 14. The power source 14 can include or employ one or more batteries, liquid fuel (e.g., gasoline, alcohol, diesel, etc.) or other energy sources. In another embodiment, the power source 14 can include one or more solar cells or one or more fuel cells. In another embodiment, the power source 14 can include combustive gas (e.g., hydrogen).

The autonomous vehicle 12 can be equipped with computing functions and controls. The autonomous vehicle 12 can include a processor 15. The autonomous vehicle 12 can include a transceiver 16. In one embodiment, the transceiver 16 can be coupled to a global position system (GPS) to generate and alert of a position of the autonomous vehicle 12 relative to other vehicles in a common coordinate system. The transceiver 16 can be equipped to communicate with a cellular network system. In this way, the autonomous vehicle's position can be computed based on triangulation between cell towers base upon signal strength or the like. The transceiver 16 can include a WIFI or equivalent radio system. The processor 15, transceiver 16, and location information can be utilized in a guidance control system 17 for the autonomous vehicle 12.

The autonomous vehicle 12 can include memory storage 18. The memory storage 18 can include solid state or soft storage and work in conjunction with other systems on the autonomous vehicle 12 to record data, run algorithms or programs, control the vehicle, etc. The memory storage 18 can include a Read Only Memory (ROM), random access memory (RAM), or any other type of memory useful for the present applications.

The autonomous vehicle 12 can include one or more cameras 19. The one or more cameras 19 can view the area surrounding the autonomous vehicle 12 to input images into a three-dimensional pose estimation system 20 and the guidance control system 17 of the autonomous vehicle 12. The one or more cameras 19 can view objects around the autonomous vehicle 12, e.g., other vehicles, building, light poles 21, trees, etc. The images obtained by the one or more cameras 19 can be processed in the three-dimensional pose estimation system 20 to learn the pose of the autonomous vehicle 12 without an IMU. The pose of the vehicle can be utilized by the guidance control system 17 to adjust the propulsion system 13 of the autonomous vehicle 12 to avoid objects around the autonomous vehicle 12.

Figure 6:
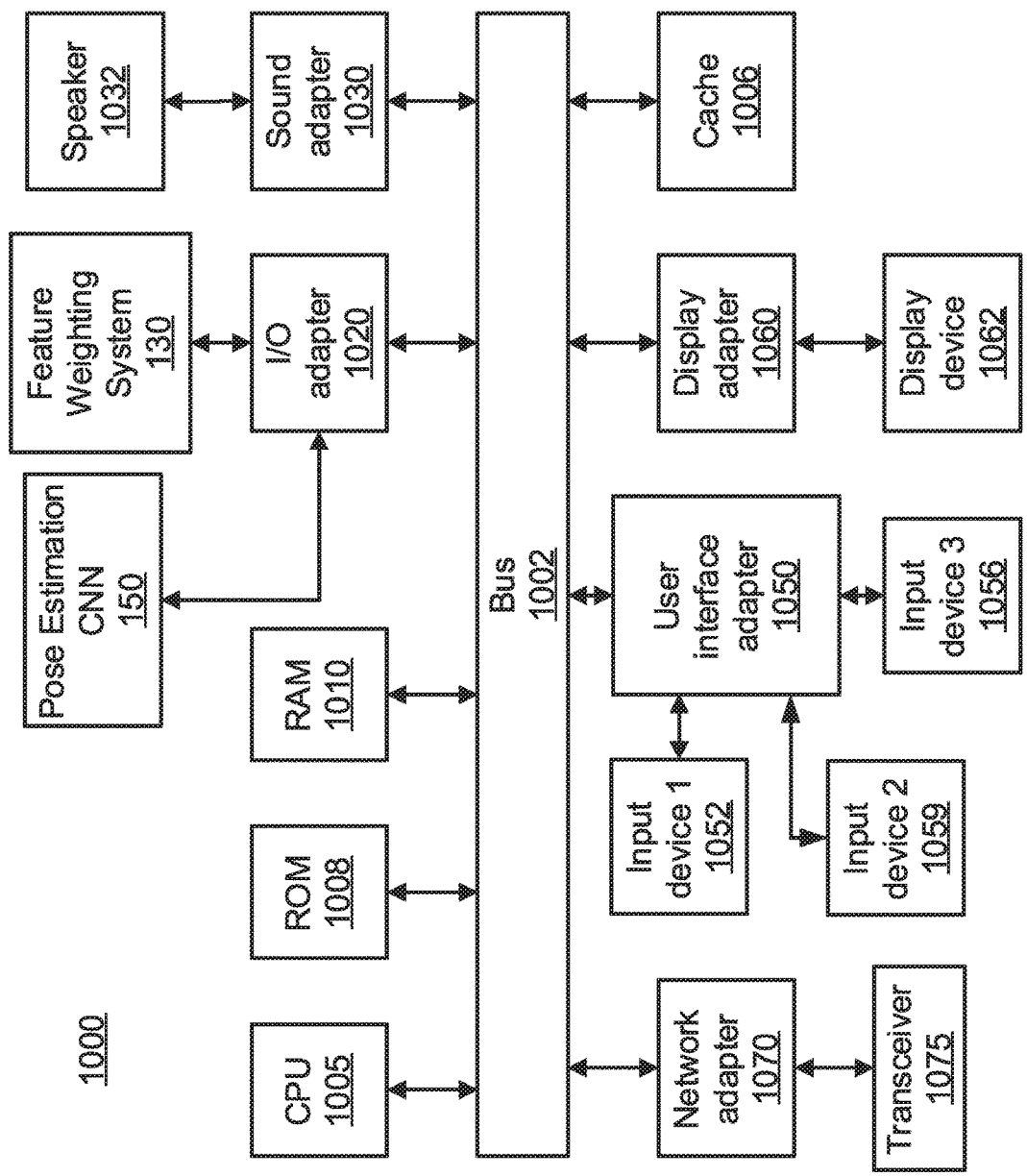
FIG. 6 shows a block/flow diagram of a computer processing system, to be used for three-dimensional pose estimation, in accordance with an embodiment of the present invention.

Referring now to FIG. 6, a block/flow diagram of a computer processing system 1000, to be employed for three-dimensional pose estimation, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

A pose estimation CNN 150 and a feature weighting system 130 can be operatively coupled to system bus 1002 by the I/O adapter 1020. The devices 130 and 150 can be employed to weight features to generate a score map and estimate a pose based on the score map.

A speaker 1032 may be operatively coupled to system bus 1002 by the sound adapter 1030. The speaker 1032 can sound an alarm when controlled. A transceiver 1075 is operatively coupled to system bus 1002 by network adapter 1070. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in the present invention. The user input devices 1052, 1059, and 1056 can be the same type of user input device or different types of user input devices. The user input devices 1052, 1059, and 1056 are used to input and output information to and from system 1000.

Of course, the computer system 1000 may also include other elements (not shown), as readily contemplated by one of skill in the art, as well as omit certain elements. For example, the system described in FIGS. 3 and 4 can be controlled by computer system 1000. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, the computer processing system 1000 can be configured to initiate an action (e.g., a control action) on a controlled system, machine, and/or device responsive to a detected pose. Such action can include, but is not limited to, one or more of: powering down the controlled system, machine, and/or device or a portion thereof; powering down, e.g., a system, machine, and/or a device that is affected by the pose of another device, stopping a centrifuge being operated by a user before an imbalance in the centrifuge causes a critical failure and harm to the user, securing an automatic door, and so forth. As is evident to one of ordinary skill in the art, the action taken is dependent upon the type of controlled system, machine, and/or device to which the action is applied.

Moreover, it is to be appreciated that network 100 and network 200 described above with respect to FIGS. 1 and 2 are networks for implementing respective embodiments of the present invention. Part or all of computer processing system 1000 may be implemented as one or more of the elements of network 100 and/or one or more of the elements of network 200.

Figure 7:
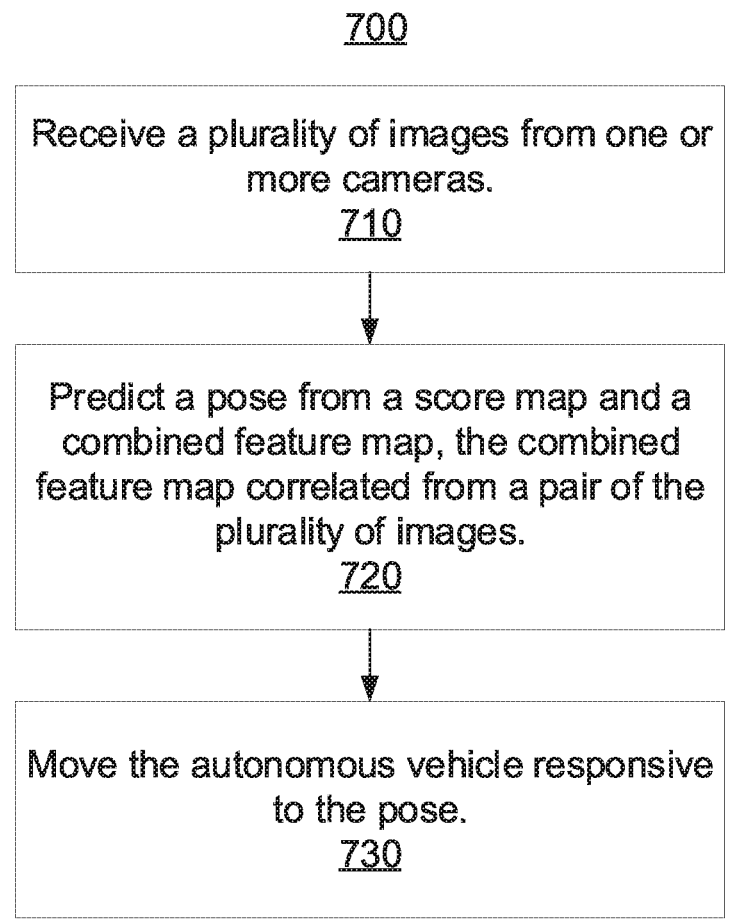
FIG. 7 shows a block/flow diagram illustrating a method for a guidance control system utilizing pose estimation in an autonomous vehicle, in accordance with an embodiment of the present invention.
Figure 8:
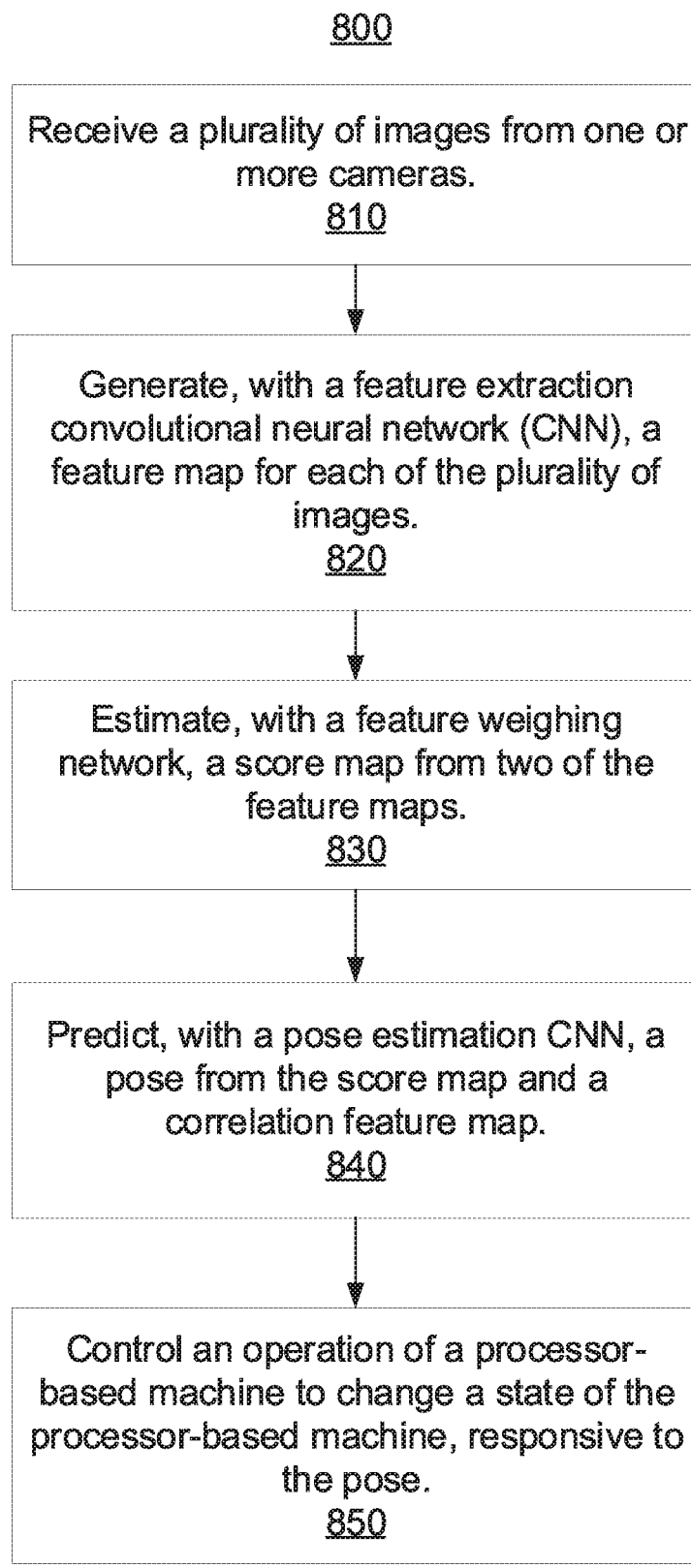
FIG. 8 shows a block/flow diagram illustrating a method for pose estimation, in accordance with an embodiment of the present invention.
Figure 9:
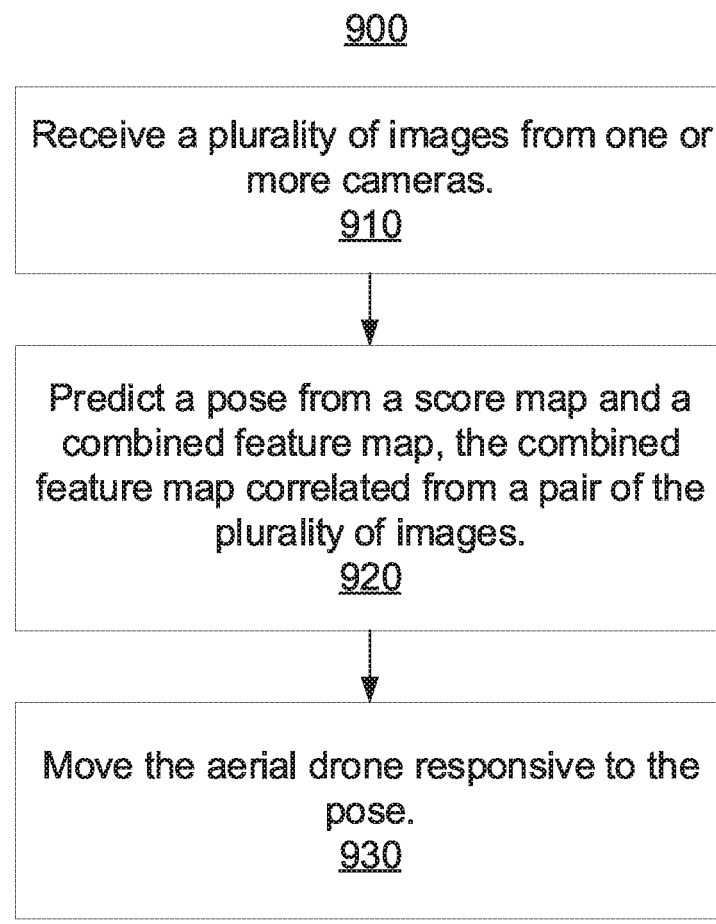
FIG. 9 shows a block/flow diagram illustrating a method for a stabilization system utilizing pose estimation in an aerial drone, in accordance with an embodiment of the present invention.

Further, it is to be appreciated that computer processing system 1000 may perform at least part of the method described herein including, for example, at least part of method 700 of FIG. 7 and at least part of method 800 of FIG. 8 and at least part of method 900 of FIG. 9.

Referring now to FIG. 7, a block/flow diagram illustrating a method 700 guidance control system utilizing pose estimation in an autonomous vehicle, in accordance with an embodiment of the present invention. In block 710, receive a plurality of images from one or more cameras. In block 720, predict a pose from a score map and a combined feature map, the combined feature map correlated from a pair of the plurality of images. In block 730, move the autonomous vehicle responsive to the pose.

Referring now to FIG. 8, a block/flow diagram illustrating a method 800 for pose estimation, in accordance with an embodiment of the present invention. In block 810, receive a plurality of images from one or more cameras. In block 820, generate, with a feature extraction convolutional neural network (CNN), a feature map for each of the plurality of images. In block 830, estimate, with a feature weighting network, a score map from a pair of the feature maps. In block 840, predict, with a pose estimation CNN, a pose from the score map and a combined feature map. In block 850, control an operation of a processor-based machine to change a state of the processor-based machine, responsive to the pose.

Referring now to FIG. 9, a block diagram illustrating a method 900 for a stabilization system utilizing pose estimation in an aerial drone, in accordance with an embodiment of the present invention. In block 910, receive a plurality of images from one or more cameras. In block 920, predict a pose from a score map and a combined feature map, the combined feature map correlated from a pair of the plurality of images. In block 930, move the aerial drone responsive to the pose.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An aerial drone utilizing pose estimation, the aerial drone comprising:
   one or more cameras;
   a propulsion system that moves the aerial drone; and
   a stabilization system that controls the propulsion system, the stabilization system includes a pose estimation system that receives a plurality of images from the one or more cameras and predicts a pose from a score map and a combined feature map, the combined feature map generated from a pair of the plurality of images, the pose estimation system including a pose estimation convolutional neural network (CNN) trained utilizing two-dimensional (2D) keypoint displacement loss employing Velodyne points.

2. The aerial drone as recited in claim 1, wherein the pose estimation system generates feature maps for each of the pair of the plurality of images and generates the combined feature map from the feature maps.

3. The aerial drone as recited in claim 2, wherein the feature maps are generated with a feature extraction CNN.

4. The aerial drone as recited in claim 1, wherein the pose estimation system includes a pose estimation CNN trained utilizing three-dimensional (3D) pose regression loss.

5. The aerial drone as recited in claim 1, wherein the pose estimation system includes a feature weighting network.

6. The aerial drone as recited in claim 5, wherein the feature weighting network estimates the score map from a pair of the feature maps.

7. The aerial drone as recited in claim 1, wherein the guidance control system steers the autonomous vehicle around obstacles.

8. The aerial drone as recited in claim 1, wherein the propulsion system is selected from the group consisting of a one or more jet engine, hover technology, one or more motors, and one or more internal combustion engine.

9. The aerial drone as recited in claim 1, wherein the combined feature map includes training utilizing motion loss.

10. The aerial drone as recited in claim 9, wherein the motion loss is determined with an optical flow CNN.

11. The aerial drone as recited in claim 1, wherein the combined feature map includes training utilizing semantics loss.

12. The aerial drone as recited in claim 11, wherein the semantics loss is determined with a semantic segmentation CNN.

13. A computer program product for a stabilization system utilizing pose estimation in an aerial drone, the computer program product comprising a non-transitory computer readable storage medium having program instructions embodied therewith, the program instructions executable by a computer to cause the computer to perform a method comprising:
   receiving, by a pose estimation system, a plurality of images from one or more cameras;
   predicting, by the pose estimation system, a pose from the score map and a combined feature map, the combined feature map correlated from a pair of the plurality of images, the pose estimation system including a pose estimation convolutional neural network (CNN) trained utilizing two-dimensional (2D) keypoint displacement loss employing Velodyne points; and
   moving, by a propulsion system, the aerial drone responsive to the pose.

14. A computer-implemented method for a stabilization system utilizing pose estimation in an aerial drone, the method comprising:
   receiving, by a pose estimation system, a plurality of images from one or more cameras;
   predicting, by the pose estimation system, a pose from the score map and a combined feature map, the combined feature map correlated from a pair of the plurality of images, the pose estimation system including a pose estimation convolutional neural network (CNN) trained utilizing two-dimensional (2D) keypoint displacement loss employing Velodyne points; and
   moving, by a propulsion system, the aerial drone responsive to the pose.

15. The computer-implemented method as recited in claim 14, wherein the combined feature map includes training utilizing motion loss.

16. The computer-implemented method as recited in claim 15, wherein the motion loss is determined with an optical flow CNN.

17. The computer-implemented method as recited in claim 14, wherein the combined feature map includes training utilizing semantics loss.

18. The computer-implemented method as recited in claim 17, wherein the semantics loss is determined with a semantic segmentation CNN.

* * * * *